Patented Nov. 9, 1948

2,453,490

UNITED STATES PATENT OFFICE 2,453,490

PROCESS OF PRODUCING A BARIUM LAKE PIGMENT

Jack Beniah Callaway, Summit, and Donald Bernard Killian, Newark, N. J., assignors to E. I. du Pont de Nemours & Company, Wilmington, Del., a corporation of Delaware No Drawing. Application May 23, 1946, Serial No. 671,910

2 Claims. (Cl. 260—197)

This invention relates to the manufacture of a new red azo pigment combining a desirable, brilliant shade with good printing qualities and low cost.

In the manufacture of printing inks there is a very large demand for red pigments of moderate cost, which combine brilliance of color with excellent resistance to bleeding in both water and oils. There are also certain less easily definable properties such as the tendency of an ink to fill the spaces between the dots of a fine screen on a printing plate, the number of copies which can be printed from a given weight of ink, the resistance to livering and the like, which influence the selection of a pigment for a given purpose.

Although Lake Red C (Col. Ind. #165) has properties satisfying the above requirements to an excellent degree, it is a relatively expensive product.

It is accordingly an object of this invention to produce a new red azo pigment of special utility in printing inks, with a brilliant bluish red shade, with excellent resistance to bleeding in both water and oils, and capable of being manufactured at a relatively moderate cost.

Now, we have found that the azo dye prepared by diazotizing 4-amino-toluene-3-sulfonic acid and coupling to beta-naphthol has the most remarkable property of yielding, upon due treatment according to this invention, a brilliant bluish red pigment of excellent printing properties satisfying the above requirements, including low cost. This effect is particularly astonishing when one considers that the known isomeric compounds of our novel pigment do not respond to our special treatment, and do not give a color of the desired bluish red shade.

The special treatment according to this invention comprises converting the azo pigment into a barium lake in the presence of a soluble metallic bicarbonate, such as sodium bicarbonate, and then digesting the lake at elevated temperature and at an alkalinity of a definite pH range. Products of particular utility are obtained when the conversion to the barium lake is carried out in the presence of sodium rosinate to give a rosinated barium lake. The step of converting an azo pigment into a rosinated barium lake is per se not novel. See for instance, U. S. Patent No. 1,772,300. But in our present invention we effect lake formation in the presence of the bicarbonate ion, and further digest the mass at a pH range of 10 or higher, with the result that the pigment lake is obtained in a special physical form, that is microscopically crystalline, which can be readily identified by means of X-ray diffraction technique, and which possesses the special bluish red shade and other excellent tinctorial properties hereinabove set forth. Without this special treatment, the rosinated barium lake of our novel azo compound is of a much yellower and less desirable tint, and is quite similar to a typical Persian Orange (Col. Ind. #151).

The structure of our novel compound before conversion into the barium lake form is, according to its mode of preparation, most likely as follows:

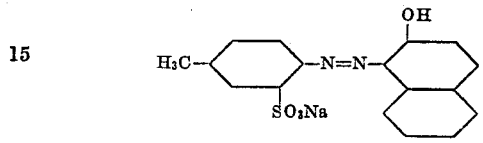

The red shade obtained by rosination and barium treatment of the above color under the special conditions of this invention may be varied somewhat and easily controlled by varying the moisture content of the final product. But regardless of moisture content and shade, the novel product resulting from the special procedure of striking above indicated is characterized by two interplanar spacings in its X-ray diffraction pattern, as more fully set forth hereinbelow.

The X-ray diffraction pattern of a pigment may be determined by subjecting a sample to X-rays in accordance with the well known Hull-Debye-Scherer or powder method. The pattern may be recorded photographically as a series of bands whose angular distance from the "zero line" (photographic record of the undivided beam), coupled with the wave length of the radiation used, are characteristic of the interplanar spacings in the crystals. However, a more precise measurement of the angular distances and of the relative intensities of the lines may be obtained by the use of a Geiger counter, a well known device for detecting radiation, attached to a recording device so that a graph is drawn plotting intensity of radiation against angular distance from the undivided beam.

When the pigment of this invention is thus examined, it is found that it possesses two characteristic interplanar spacings of 15.3Å. (±0.5Å.) and 11.3Å. (±0.5Å.), with a relative intensity of the larger to the smaller spacing of approximately 5. This pattern is independent of the moisture content of the sample. If the barium-rosination is effected in the absence of sodium bicarbonate (or its equivalent, say potassium or ammonium bicarbonate), the pigment pattern still shows the characteristic interplanar spacings, but their dimensions are significantly different and their relative intensity is considerably different.

Without limiting our invention, the following examples are given to illustrate our preferred mode of operation. Parts mentioned are by weight.

Example 1

187 parts of para toluidine meta sulfonic acid is dissolved in 2000 parts of water containing 40 parts of caustic soda. Ice is added to cool the solution to about 0° C. and to increase the volume to the equivalent of 3750 parts and a solution of 70 parts of sodium nitrite in 225 parts water is added followed by a solution of hydrochloric acid equivalent to 80 parts HCl (100%). After stirring for 5 minutes the diazo is ready for coupling.

In a separate vessel, 150 parts of beta-naphthol is dissolved in a hot solution of 45 parts of caustic soda in 2500 parts of water and then adjusted to a volume of 5000 parts at about 25° C. A solution containing 25 parts of acetic acid (100%) is then added and the pH adjusted to about 5.5 with a solution containing about 25 parts of HCl (100%). The diazo is added rapidly to this acidified suspension of beta-naphthol and coupling is brought about by adding slowly (in about 5 minutes) a solution of 60 parts caustic soda in 450 parts water to give a pH of 9.2–10.0. After stirring 15 minutes to insure completion of coupling, 93 parts of sodium bicarbonate dissolved in 500 parts of water is added followed by a sodium rosinate solution obtained by dissolving 100 parts of K Wood Rosin in a boiling solution of 20 parts caustic soda in 2400 parts water and diluting to 4800 parts at 60° C.

After adjusting the volume to the equivalent of 30,000 parts, the mixture is heated to 40° C. in about 15 minutes and struck with a solution of 263 parts of barium chloride in 2500 parts of water. After stirring a short time the pH is adjusted to about 10.5 with a solution containing about 35 parts of caustic soda and the mixture developed at the boil for about 20 minutes. After quenching, it is filtered, washed free of soluble salts and dried at 80°–85° C. to give about 600 parts of a desirable red pigment.

Example 2

Example 1 is repeated except that the addition of sodium bicarbonate to the sodium salt of the dye prior to strike and development is omitted. This also makes unnecessary the addition of caustic soda in the final adjustment of pH. The resulting pigment exhibits a very dark masstone and a reddish orange tint when dispersed in lithographic varnish, the color being very much yellower than that of Example 1 and quite similar to that commonly known in the trade as Persian Orange.

Example 3

57 parts of para-toluidine-meta-sulfonic acid is dissolved in 1000 parts of water containing 15 parts of caustic soda. Ice is added to cool the solution to about 0° C. and to increase the volume to the equivalent of 1500 parts, and a solution of 21 parts of sodium nitrite in 100 parts of water is added followed by a solution of hydrochloric acid equivalent to 35 parts HCl (100%). After stirring for 5 minutes the diazo is ready for coupling. The diazo solution is split into two equal portions by volume, and each half coupled separately to the beta-naphthol solutions A and B, respectively, described below.

(A) In a separate vessel, 30 parts of beta-naphthol is dissolved in a hot solution of 16.2 parts of caustic soda in 500 parts of water, and then adjusted to a volume of 800 parts at 25° C. The diazo solution A is added rapidly to this solution of beta-naphthol and coupling occurs in about fifteen minutes. The resultant solution has a pH of 10.0. After stirring 15 minutes, the mixture is heated to 40° C. in about 15 minutes and struck with a solution of 50 parts of barium chloride in 400 parts water. After stirring a short time the pH is adjusted to about 10.0 with a solution containing about 1 part of caustic soda and the mixture developed at the boil for about 20 minutes. After quenching, it is filtered, washed free of soluble salts and dried at 80–85° C. to give about 63 parts of an orange pigment.

(B) In a separate vessel, solution B of beta-naphthol is made exactly as described for A above. The coupling of diazo solution B is carried out as described in A above or by the method of Example 1, as described. After coupling, the pH of the mixture is adjusted to 10 by addition of a caustic soda solution. To the mixture is added 13 parts of sodium bicarbonate dissolved in 75 parts of water.

The mixture is stirred for about five minutes and heated to 40° C. in about 15 minutes and struck with a solution of about 50 parts of barium chloride in 400 parts of water. After stirring a short time, the pH is adjusted to about 10.5 with a solution containing about 5 parts of caustic soda and the mixture developed at the boil for about 20 minutes. After quenching, it is filtered, washed free of soluble salts and dried at 80–85° C. to give about 75 parts of a desirable red pigment.

The resulting pigment B exhibits a medium red masstone and a bluish red tint when dispersed in lithographic varnish, the color being very much bluer than the reddish orange masstone and yellow tint of pigment A.

It will be clear that the above examples are merely illustrative, and that the details thereof may be varied within the skill of those engaged in this art. Thus, in Example 1 above, in lieu of striking the color with barium in the presence of sodium rosinate, the sodium salt of the azo dye obtained after coupling to beta-naphthol may also be converted into any other of the customary metallic salts, for instance calcium, barium (not rosinated), manganese, strontium, aluminum, iron, titanium, etc., and used as a pigment.

In its broadest aspect, therefore, this invention contemplates, as new chemical compositions, the azo dye from diazotized para-toluidine-meta-sulfonic acid and beta-naphthol and its metallic salts, particularly the rosinated barium salt. In its preferred embodiment, the invention is concerned with a modification exhibiting a characteristic color and distinctive X-ray diffraction pattern, and made by a preferred and distinctive process. In carrying out the preferred process, the method of coupling is not critical. Thus, in place of the method shown, the acid diazo may be added slowly to a solution of beta-naphthol containing sufficient alkali to neutralize the excess acid in the diazo and that formed during the coupling reaction.

The only critical points in the process are the use of a soluble metallic bicarbonate in sufficient quantity to insure the presence of the bicarbonate ion during the preliminary development of the soda salt and the reaction with barium chloride, and the development of the final product by digestion at a temperature not less than 80° C. and under strongly alkaline conditions.

The pigment of Example 1 is capable of exhibiting a considerable range of color which appears to be a function of its moisture content. When incompletely dried or when hydrated by exposure to humid atmospheres, the pigment exhibits a relatively light masstone and a relatively yellow tint when dispersed in a printing ink vehicle. At the opposite extreme, for instance when the pigment is dried at 80–85° C. as directed in Example 1, which gives a moisture content below 1% (usually about 0.7%–0.8%), the color has a much darker masstone and bluer tint. Nevertheless, the ability to obtain a relatively wide range of shades by a simple control of moisture content has many points of merit, since the market may be demanding different shades of the above bicarbonate product on different occasions.

The products of this invention, particularly the preferred bicarbonate type, are useful for coloring printing inks and similar compositions because of their pleasing shade and excellent working properties.

The preferred pigments of this invention offer substantially the same color as the widely used prior art pigment comprising the barium salt of Lake Red C, with superior working properties on the press and with a significantly lower cost per print.

We claim as our invention:

1. The process of producing an improved barium lake pigment, which comprises treating an aqueous slurry of the azo color represented by the formula

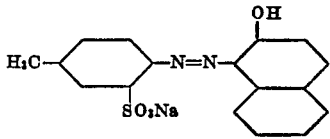

with barium chloride in the presence of a soluble metallic bicarbonate, alkalizing the mixture to a pH of at least 10, digesting the same at a temperature not less than 80° C., and eventually separating the color from the aqueous phase.

2. The process of producing an improved barium lake pigment, which comprises treating an aqueous slurry of the azo color represented by the formula

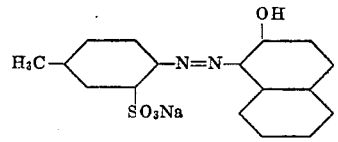

with sodium rosinate and barium chloride in the presence of a soluble metallic bicarbonate, alkalizing the mixture to a pH of at least 10, digesting the same at a temperature not less than 80° C., and eventually separating the color from the aqueous phase.

JACK BENIAH CALLAWAY.
DONALD BERNARD KILLIAN.

REFERENCES CITED

The following references are of record in the file of this patent:

UNITED STATES PATENTS

| Number | Name | Date |
| --- | --- | --- |
| 309,882 | Roussin et al. | Dec. 30, 1884 |
| 733,280 | Schirmacher | July 7, 1903 |
| 759,716 | Julius et al. | May 10, 1904 |
| Re. 18,590 | Allen et al. | Sept. 6, 1922 |
| 2,013,091 | Erskine et al. | Sept. 3, 1935 |
| 2,229,049 | Dahlen et al. | Jan. 21, 1941 |

FOREIGN PATENTS

| Number | Country | Date |
| --- | --- | --- |
| 4,491 | Great Britain | A. D. 1878 |
| 23,831 | Great Britain | A. D. 1902 |
| 565,266 | Germany | Nov. 28, 1932 |